United States Patent
Matsuda

Patent Number: 6,070,121
Date of Patent: May 30, 2000

[54] ROAD SHAPE DETERMINING DEVICE AND VEHICLE CONTROL SYSTEM

[75] Inventor: Shohei Matsuda, Wako, Japan

[73] Assignee: Honda Giken Kogyo Kabushiki Kaisha, Tokyo, Japan

[21] Appl. No.: 09/084,176

[22] Filed: May 26, 1998

[30] Foreign Application Priority Data

May 26, 1997 [JP] Japan .................................... 9-134888

[51] Int. Cl.[7] .................................................... G05D 3/00
[52] U.S. Cl. .......................... 701/205; 342/456; 342/961; 340/995; 364/448; 364/447; 701/70
[58] Field of Search ............................ 701/200–211, 120, 701/70; 342/456, 961; 340/995; 364/448, 447

[56] References Cited

U.S. PATENT DOCUMENTS

| | | | |
|---|---|---|---|
| 5,629,855 | 5/1997 | Kyrtsos et al. | 364/460 |
| 5,911,775 | 6/1999 | Tanimoto | 701/210 |
| 5,928,305 | 7/1999 | Nomura | 701/207 |
| 5,941,934 | 8/1999 | Saro | 701/217 |

FOREIGN PATENT DOCUMENTS 5-141979  6/1993  Japan .

*Primary Examiner*—William A. Cuchlinski, Jr.
*Assistant Examiner*—Ronnie Mancho
*Attorney, Agent, or Firm*—Arent Fox Kintner Plotkin & Kahn PLLC

[57] ABSTRACT

An error in road data is compensated for to correctly determine an actual road shape and to carry out a precise vehicle control on the basis of the determined road shape. A deviation $\Delta\theta V$ between an azimuth angle $\theta V$ of movement of a vehicle and an azimuth angle $\theta 1$ of a road connecting a node $N_0$ behind the position of the vehicle and a node $N_1$ ahead of the position of the vehicle, or a deviation $\Delta\theta V$ between the azimuth angle $\theta V$ of movement of a vehicle and an azimuth angle $\theta 1$ of a road connecting the position of the vehicle and the node $N_1$ ahead of the position of the vehicle, is calculated. When the deviation $\Delta\theta V$ is equal to or greater than a reference value it is determined that there is an error in the position of the node $N_1$, and the road shape presumed from the road data is corrected to the actual road shape. Then, a warning operation for advising a driver of a decelerating operation or an automatic braking operation is carried out on the basis of the corrected road shape so that the vehicle can pass through the curve ahead of the vehicle.

32 Claims, 8 Drawing Sheets

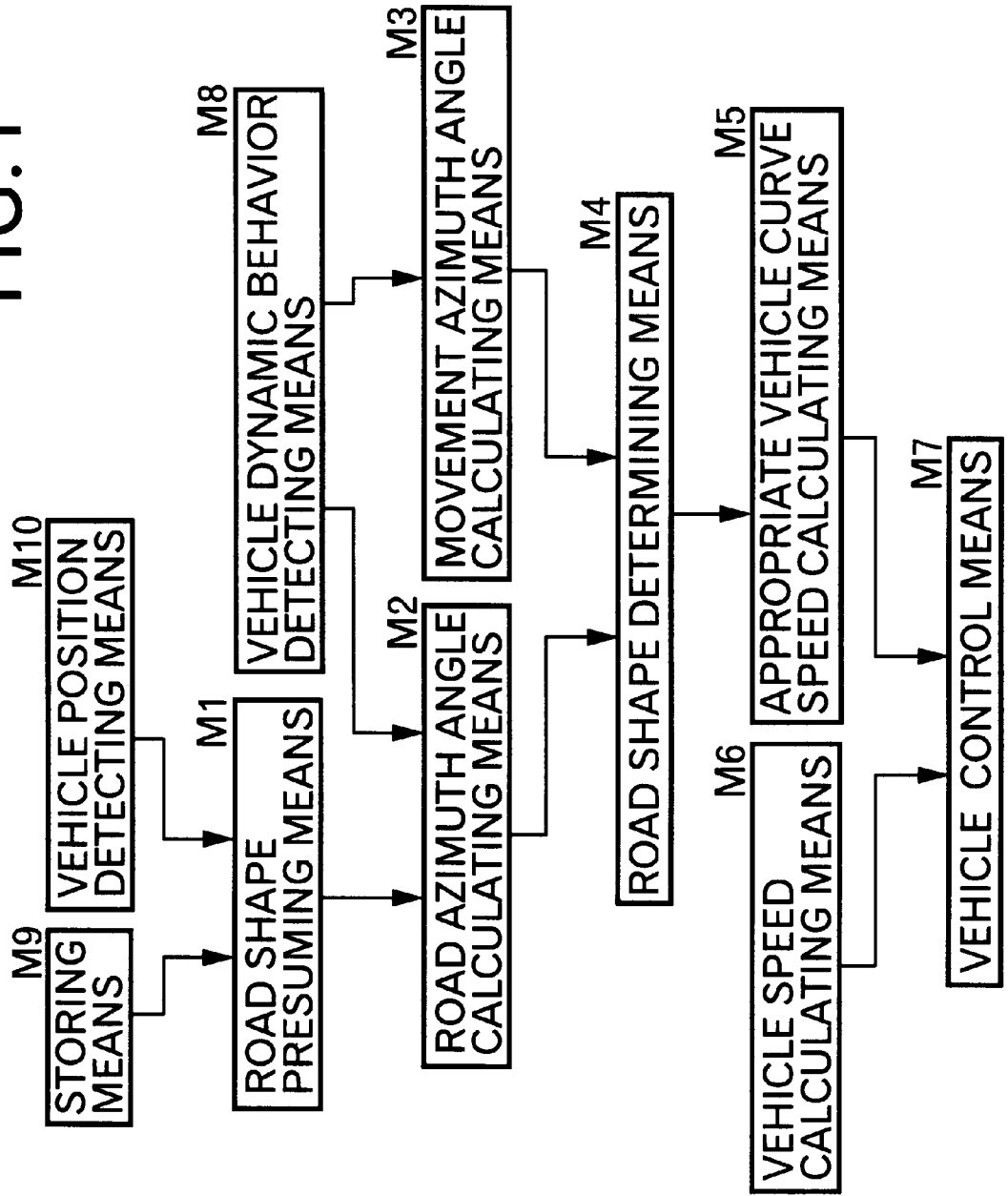

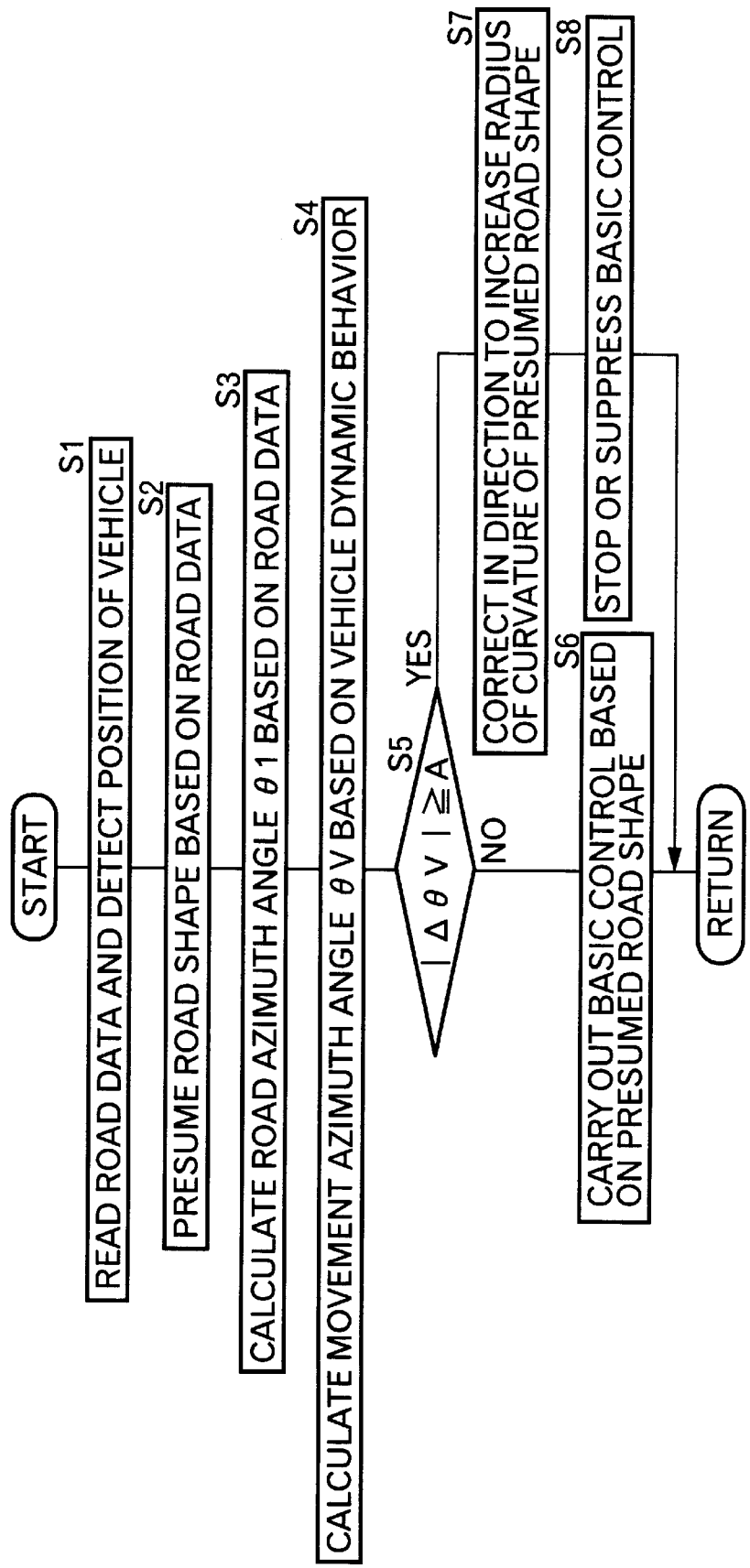

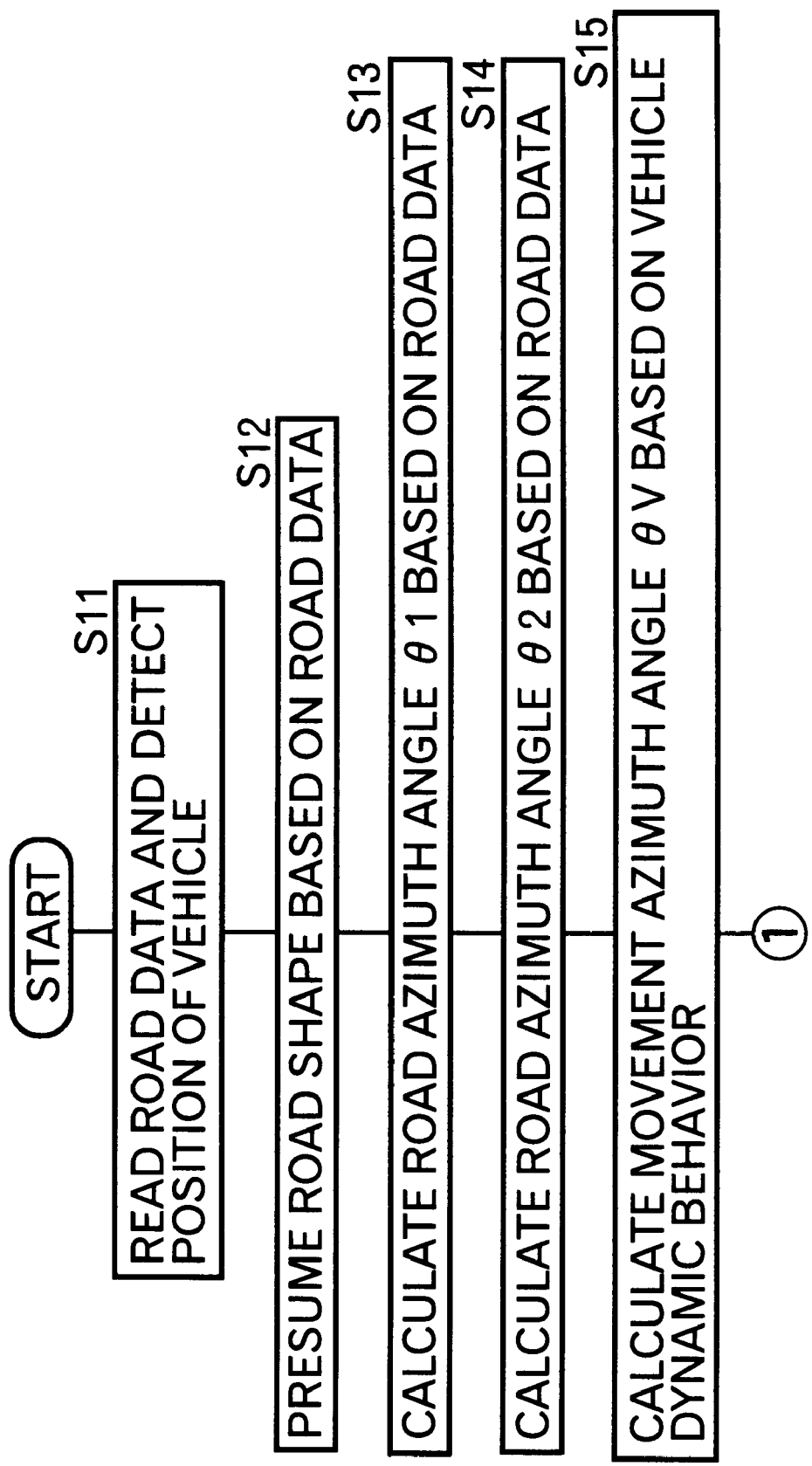

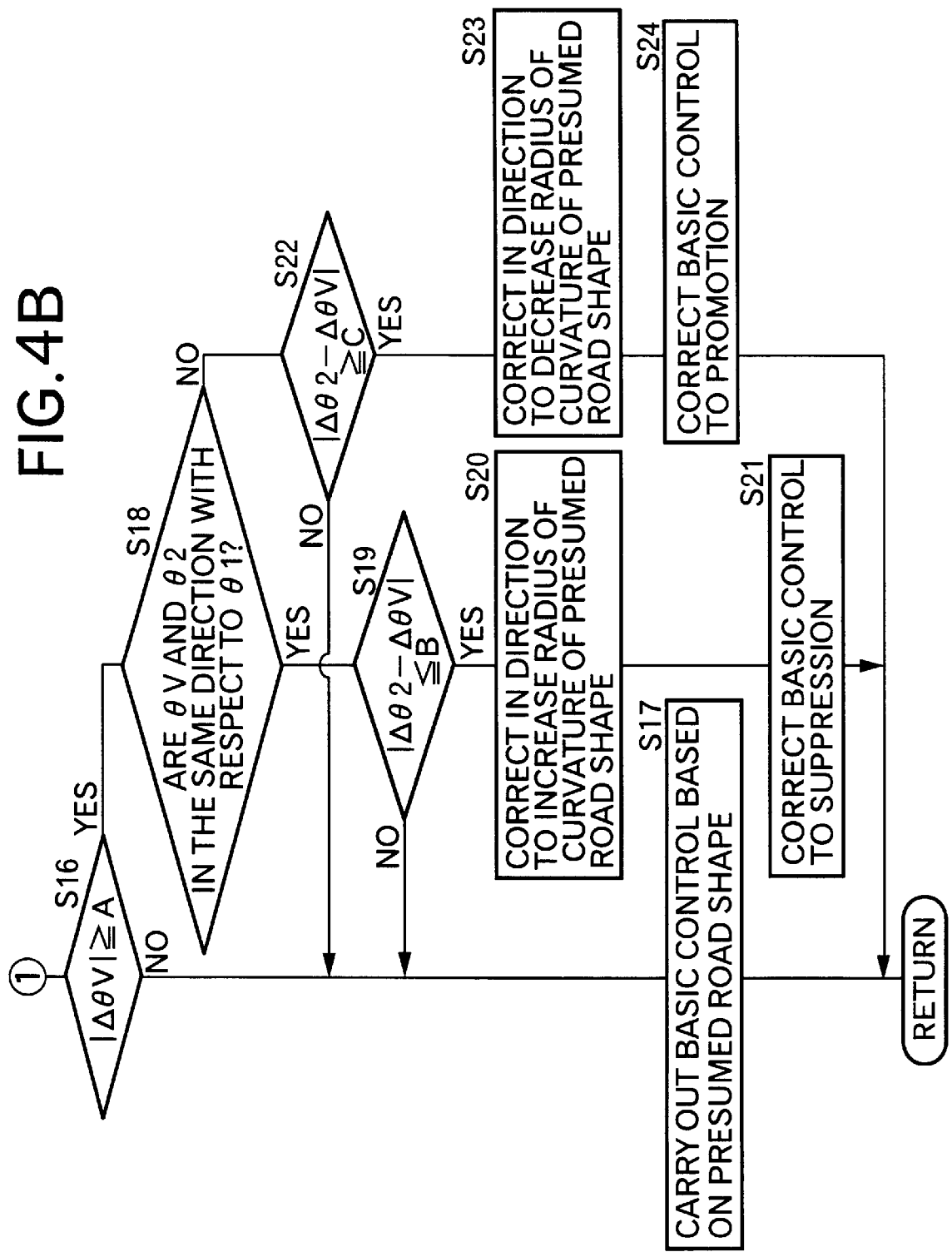

ROAD SHAPE DETERMINING DEVICE AND VEHICLE CONTROL SYSTEM

BACKGROUND OF THE INVENTION

1. Field of the Invention

The present invention relates to a road shape determining device for determining the shape of a road ahead of the position of a vehicle on the basis of road data, and a vehicle control system for controlling the vehicle on the basis of the road shape determined by the road shape determining device.

2. Description of the Prior Art

A road shape determining device and a vehicle control system are known from Japanese Patent Application Laid-open No. 5-141979, in which the radius of curvature of a curve of the road is presumed by calculating the radius of an arc passing through three nodes, and an appropriate vehicle curve speed of the vehicle is calculated on the basis of the radius of curvature of the curve compared with a presumed vehicle curve speed of the vehicle calculated on the basis of the current vehicle speed. If the presumed vehicle curve speed of the vehicle is equal to or lower than the appropriate vehicle curve speed of the vehicle, it is determined that the vehicle can pass through the curve.

When the road is repaired after generating road data, or when there is a mistake in generating the road data, the actual road shape may not match with the road data. For example, in the case of FIG. 8, there is the following problem: The radius of curvature of the curve determined from the mistaken road data, is smaller than the radius of curvature of the curve of the actual road. For this reason, when a warning operation or an automatic braking operation is carried out so that the vehicle can pass through the curve having the smaller radius of curvature, an unnecessary warning or automatic braking operation is carried out to provide a sense of incompatibility to a driver.

SUMMARY OF THE INVENTION

The present invention has been accomplished with the above circumstance in view, and it is an object of the present invention to compensate for the error in the road data to precisely determine an actual road shape, and to carry out proper vehicle control on the basis of the determined road shape.

To achieve the above object, there is provided a road shape determining device for determining the shape of a road ahead of the position of a vehicle, on the basis of road data. The determining device comprises a road azimuth angle calculating means for calculating an azimuth angle of the road ahead of the position of the vehicle on the basis of the road data; a movement azimuth angle calculating means for calculating an azimuth angle of movement of the vehicle; and a road shape determining means for determining the shape of the road ahead of the position of the vehicle by comparing the road azimuth angle calculated by the road azimuth angle calculating means with the azimuth angle of movement of the vehicle calculated by the movement azimuth angle calculating means.

With the above arrangement, if the road data deviates from the actual road shape, the road azimuth angle calculated by the road azimuth angle calculating means deviates with respect to the movement azimuth angle calculated by the movement azimuth angle calculating means. Therefore, road data having an error can be discriminated in accordance with the deviation to determine a correct road shape.

A road shape determining device is provided for determining the shape of a road ahead of the position of a vehicle on the basis of road data, comprising a vehicle dynamic behavior detecting means for detecting the dynamic behavior of the vehicle; a road azimuth angle calculating means for calculating the azimuth angle of the road ahead of the position of the vehicle on the basis of the road data and the dynamic behavior of the vehicle; a movement azimuth angle calculating means for calculating the azimuth angle of movement of the vehicle; and a road shape determining means for determining the shape of the road ahead of the position of the vehicle by comparing the road azimuth angle calculated by the road azimuth angle calculating means with the azimuth angle of movement of the vehicle calculated by the movement azimuth angle calculating means.

With the above arrangement, if the road data deviates from the actual road shape, the road azimuth angle calculated by the road azimuth angle calculating means, deviates with respect to the movement azimuth angle calculated by the movement azimuth angle calculating means. Therefore, road data having an error can be discriminated in accordance with the deviation to determine a correct road shape.

Further, a vehicle control system is provided for controlling a vehicle on the basis of the shape of a road determined by a road shape determining device of the above-described type, comprising an appropriate vehicle curve speed calculating means for calculating an appropriate vehicle curve speed for passing through a road, ahead of the position of the vehicle, on the basis of the determined road shape; and a vehicle control means for carrying out vehicle control on the basis of the vehicle speed of the vehicle and the calculated appropriate vehicle speed.

With the above arrangement, it is possible to determine whether the vehicle can pass through the road ahead of the vehicle, thereby carrying out the vehicle control, so that the vehicle can safely pass through the road ahead of the vehicle.

BRIEF DESCRIPTION OF THE DRAWINGS

FIG. 1 is an illustration of a vehicle control system according to an embodiment of the present invention.

FIG. 2 is a flow chart for explaining the operation according to an embodiment of the present invention.

FIGS. 4A and 4B are a flow chart for explaining the operation of a second embodiment of the present invention.

DETAILED DESCRIPTION OF THE PREFERRED EMBODIMENT

Figure 3A:
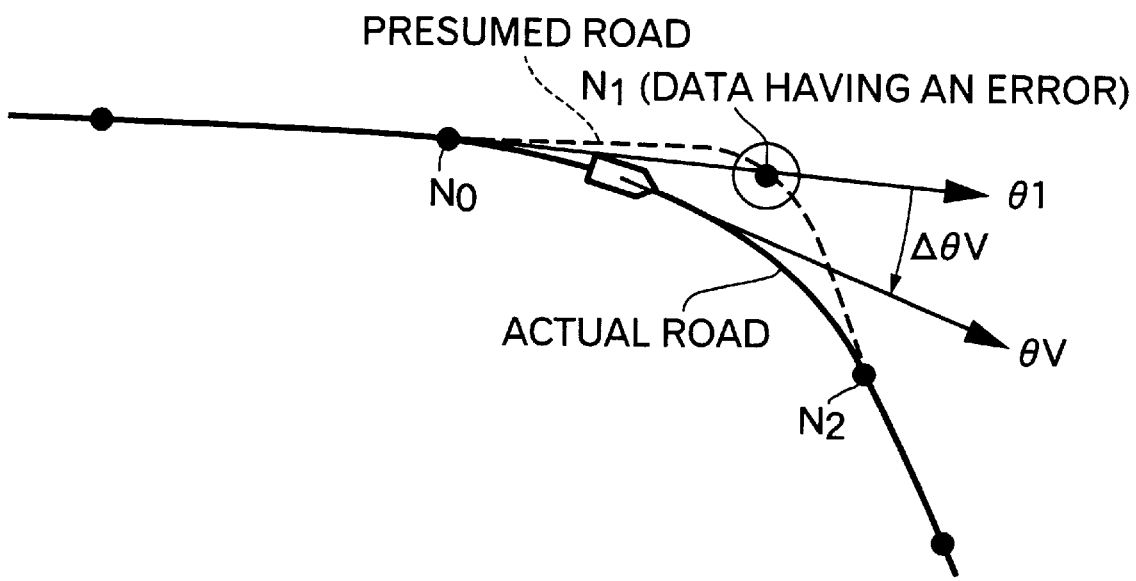
FIGS. 3A and 3B are illustrations for explaining the road azimuth angle and the movement azimuth angle.

As shown in FIG. 1, the vehicle control system includes a road shape presuming means M1, a road azimuth angle calculating means M2, a movement azimuth angle calculating means M3, a road shape determining means M4, an appropriate vehicle curve speed calculating means M5, a vehicle speed calculating means M6, a vehicle control means M7, a vehicle dynamic behavior detecting means M8, a storing means M9, and a vehicle position detecting means M10.

The road shape presuming means M1 presumes the shape of a road ahead of the position of the vehicle on the basis of road data stored in the storing means M9 comprising, for example, a CD-ROM or an IC card, and the vehicle position detected by the vehicle position detecting means M10 comprising a satellite communication device or a gyro device. The road data comprises coordinates of a large number of nodes disposed at predetermined distances along a road, and the presumed shape of a road may be different from an actual road shape due to an error in position of the node or due to the repairing of the road.

The road azimuth angle calculating means M2 calculates a road azimuth angle (a direction of extension of the road) on the basis of the presumed shape of the road or on the basis of the presumed shape of the road and the vehicle dynamic behavior (the vehicle speed or the yaw rate) detected by the vehicle dynamic behavior detecting means M8. The road azimuth angle is defined as being a positive angle in a clockwise direction from a fiducial line provided by a predetermined reference (e.g., a north direction).

The movement azimuth angle calculating means M3 detects an azimuth angle of movement of the vehicle (a direction of movement of the vehicle) on the basis of the vehicle dynamic behavior (the yaw rate) detected by the vehicle dynamic behavior detecting means M8 or on the basis of information transmitted from a beacon or the like provided in a base station such as an FM multiplex broadcast and the like or on a road. The azimuth angle of movement of the vehicle is defined as being a positive angle in a clockwise direction from a fiducial line provided by the same reference as for the road azimuth angle (e.g., a north direction).

The road shape determining means M4 determines the road shape by comparing the road azimuth angle calculated by the road azimuth angle calculating means M2 with the azimuth angle of movement of the vehicle calculated by the movement azimuth angle calculating means M3. More specifically, it is determined that the road shape presumed by the road shape presuming means M1 has a satisfactory accuracy, and this the road shape is employed as it is, or it is determined that the presumed road shape has an error, and this road shape is corrected.

The appropriate vehicle curve speed calculating means M5 calculates an appropriate vehicle curve speed as a vehicle speed enabling the vehicle to pass through the node, for example, at a lateral acceleration equal to or less than a preset reference value. When the radius of curvature of a curve is smaller, namely, when it is difficult for the vehicle to pass through the curve, the appropriate vehicle curve speed is smaller, and when the radius of curvature of a curve is larger, namely, when it is easy for the vehicle to pass through the curve, the appropriate vehicle curve speed is large.

The vehicle speed calculating means M6 calculates a vehicle curve speed for passing of the vehicle through a curve by detecting the vehicle speed from the number of rotations of a wheel, or by measuring the acceleration or deceleration of the vehicle.

The vehicle control means M7 is adapted to carry out a warning operation or an automatic decelerating operation of the vehicle on the basis of the determined road shape, so that the vehicle can reliably pass a curve ahead of the vehicle.

The operation of the first embodiment of the present invention will be described below with reference to the flow chart in FIG. 2.

First, at step S1, road data is read from the storing means M9, and the position of the vehicle is detected by the vehicle position detecting means M10. At subsequent step S2, the road shape presuming means M1 presumes a road shape ahead of the vehicle position on the basis of the road data and the vehicle position. As shown in FIG. 3, the presumed road shape comprises an aggregate of a plurality of nodes N ($N_0$, $N_1$, $N_2$ ... ). For example, if the data of the node $N_1$ is substantially different from the actual road, the presumed road shape (shown by a broken line in FIG. 3) does not match with an actual road shape (shown by a solid line).

Then, at step S3, a road azimuth angle $\theta 1$ is calculated by the road azimuth angle calculating means M2. There are two techniques to calculate the road azimuth angle $\theta 1$. The first technique is shown in FIG. 3A, and a second technique is shown in FIG. 3B.

Figure 3B:
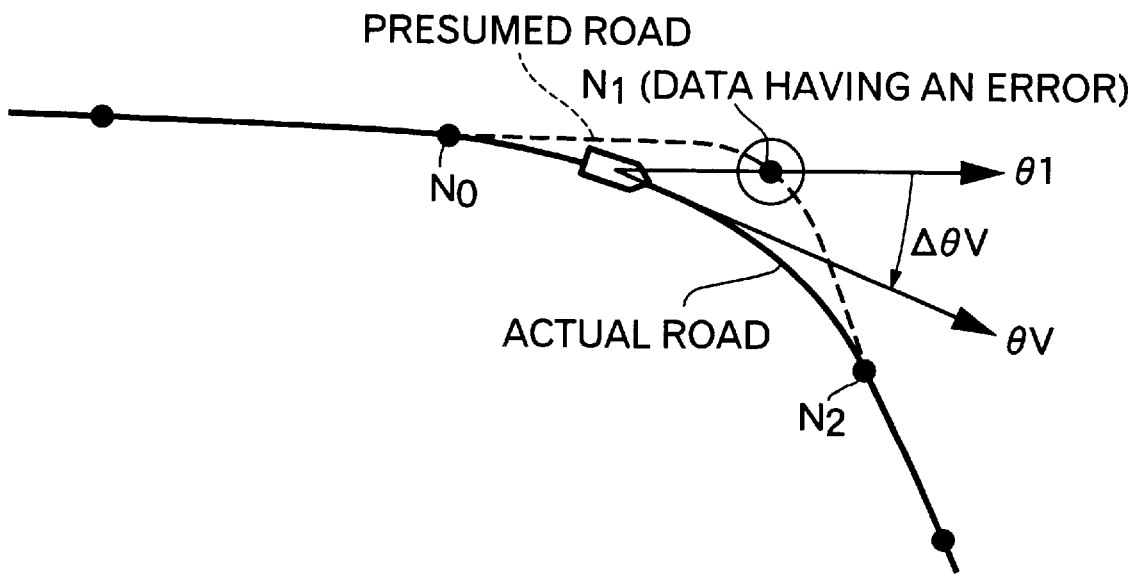

First, in the first technique shown in FIG. 3A, the road azimuth angle $\theta 1$ is calculated on the basis of the presumed road shape. More specifically, the road azimuth angle $\theta 1$ is calculated as a direction interconnecting the node $N_0$ behind the position of the vehicle and the node $N_1$ ahead of the position of the vehicle. In the second technique shown in FIG. 3B, the road azimuth angle $\theta 1$ is calculated on the basis of the presumed road shape and the vehicle speed and the yaw rate detected by the vehicle dynamic behavior detecting means M8. More specifically, the road azimuth angle $\theta 1$ is calculated as a direction interconnecting the position of the vehicle presumed from the vehicle speed and the yaw rate and the node $N_1$ ahead of the position of the vehicle.

Then, at step S4, an azimuth angle $\theta V$ of movement of the vehicle is calculated by the movement azimuth angle calculating means M3. The azimuth angle $\theta V$ of movement of the vehicle can also be calculated on the basis of the yaw rate detected by the vehicle dynamic behavior detecting means M8 in the case of either of the techniques shown in FIGS. 3A and 3B. The azimuth angle $\theta V$ of movement of the vehicle can be also calculated on the basis of the information transmitted from the beacon or the like provided in the base station such as an FM multiplex broadcast, or on the road.

Then, at step S5, a deviation $\Delta\theta V$ ($\Delta\theta V=\theta V-\theta 1$) between the movement azimuth angle $\theta V$ and the road azimuth angle $\theta 1$ is calculated by the road shape determining means M4, and the absolute value of the deviation $\Delta\theta V$ is compared with a preset reference value A. As a result, if the absolute value of the deviation $\Delta\theta V$ is smaller than the reference value A, namely, if the movement azimuth angle $\theta V$ is approximately equal to the road azimuth angle $\theta 1$, it is determined that the accuracy of the position of the node $N_1$ in the road shape presumed at step S2 is sufficient, and the basic control of the vehicle is carried out by the vehicle control means M7 on the basis of the road shape presumed at step S6.

The contents of the basic control of the vehicle by the vehicle control means M7 will be described below.

When the road shape is determined by the road shape determining means M4, the appropriate vehicle curve speed calculating means M5 calculates the radius of curvature of a curve on the basis of the arrangement of the nodes N on the road and calculates an appropriate vehicle curve speed for reliably passing of the vehicle through the nodes N on the road on the basis of the radius of curvature. However, the vehicle speed calculating means M6 calculates a vehicle curve speed for passing of the vehicle through the curve ahead of the vehicle, on the basis of the current vehicle speed. The vehicle control means M7 compares the appropriate vehicle curve speed with the vehicle curve speed calculated by the vehicle speed calculating means M6. As a result, if the vehicle curve speed calculated by the vehicle speed calculating means M6 is equal to or greater than the appropriate vehicle curve speed, it is determined that it is necessary to carry out a decelerating operation of the vehicle to allow the vehicle to pass through the curve ahead of the vehicle. Thus, a warning is given to the driver by a buzzer or a chime to advise the driver to decelerate the vehicle, and a brake device is operated by an actuator to carry out the automatic decelerating operation.

If the absolute value of the deviation $\Delta\theta V$ is equal to or greater than the reference value A at step S5 in the flow chart shown in FIG. 2, namely, if the deviation between the movement azimuth angle $\theta V$ and the road azimuth angle $\theta 1$ is greater, it is determined that the position of the node $N_1$ in the road shape presumed at step S2 is substantially deviated from the actual road, and the position of the node $N_1$ is corrected at step S7 in a direction to increase the radius of curvature of the curve (i.e., in a direction to gentle the curve). In other words, the position of the node $N_1$ is corrected, so that the presumed road shape shown by the broken line in each of FIG. 3A and 3B is matched with the actual road shape shown by the solid line.

When the position of the node $N_1$ is corrected, so that the radius of curvature of the curve in the road shape is increased in the above manner, the appropriate vehicle curve speed is increased to facilitate the passing of the vehicle through the curve, leading to a reduced possibility that the vehicle curve speed may become equal to or greater than the appropriate vehicle curve speed. Namely, depending upon the result of the correction, the carrying-out of the warning operation or the automatic decelerating operation may be stopped or suppressed at step S8. The suppression of the warning operation and the automatic decelerating operation will be described hereinafter.

A second embodiment of the present invention will be described with reference to FIGS. 4 to 6.

In the second embodiment, the correction is carried out in directions to increase and decrease the radius of curvature of a curve by calculating two road azimuth angles $\theta 1$ and $\theta 2$ and comparing these angles $\theta 1$ and $\theta 2$ with a movement azimuth angle $\theta V$.

As can be seen from comparison of FIGS. 2 and 4, the contents of steps S11, S12 and S15 in the second embodiment are the same as those of steps S1, S2 and S4 in the first embodiment. However, the second embodiment is different from the first embodiment in which only the single road azimuth angle $\theta 1$ is calculated at step S3, in that the first road azimuth angle $\theta 1$ and the second road azimuth angle $\theta 2$ are calculated at step S13 and S14.

Figure 5A:
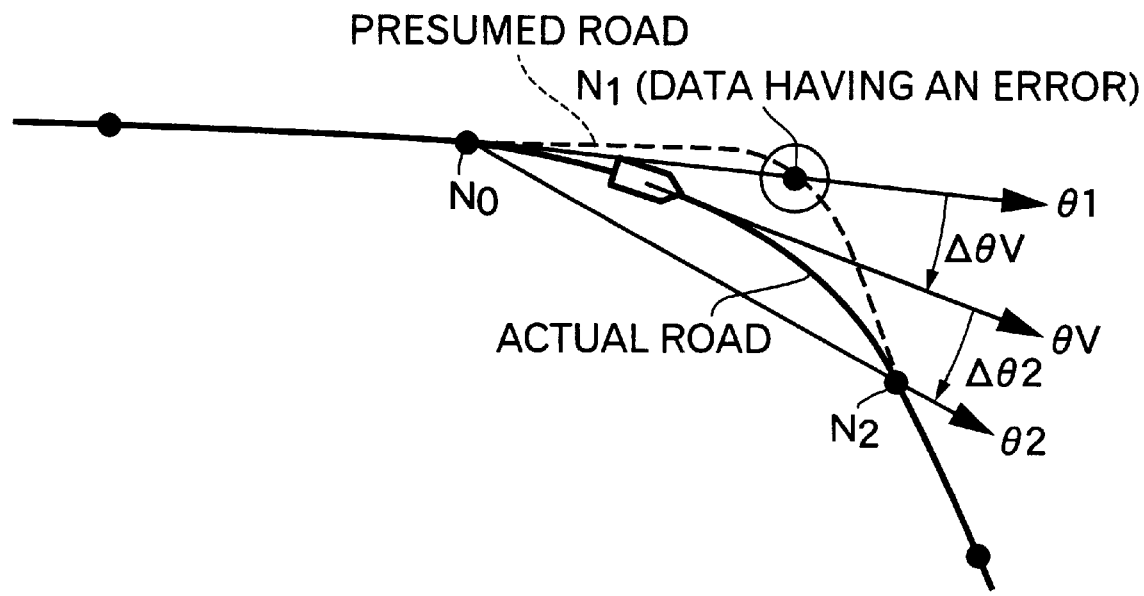
FIGS. 5A and 5B are illustrations for explaining the correction in a direction to increase the radius of curvature of a curve.
Figure 5B:
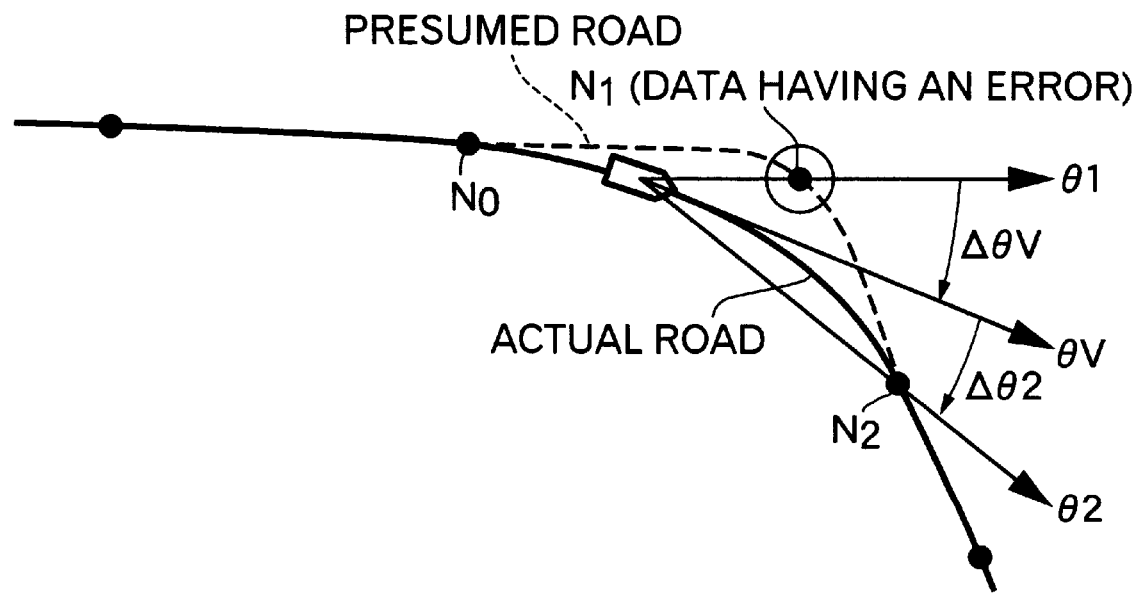

There is a first technique shown in FIG. 5A and a second technique shown in FIG. 5B to calculate the first road azimuth angle $\theta 1$ and the second road azimuth angle $\theta 2$. In the first technique shown in FIG. 5A, the first road azimuth angle $\theta 1$ is calculated as a direction interconnecting a node $N_0$ behind the position of the vehicle and a node $N_1$ ahead of the position of the vehicle, and the second road azimuth angle $\theta 2$ is calculated as a direction interconnecting the node $N_0$ behind the position of the vehicle and a node $N_2$ further ahead of the node $N_1$. However, in the second technique shown in FIG. 5B, the first road azimuth angle $\theta 1$ is calculated as a direction interconnecting the position of the vehicle presumed from the vehicle speed and the yaw rate and the node $N_1$ ahead of the position of the vehicle, and the second road azimuth angle $\theta 2$ is calculated as a direction interconnecting the position of the vehicle and the node $N_2$ further ahead of the node $N_1$.

The movement azimuth angle $\theta V$ provided at step S15 is calculated in the same manner as the calculation of the movement azimuth angle $\theta V$ at step S4 in the first embodiment. The movement azimuth angle $\theta V$ can be calculated on the basis of the yaw rate detected by the vehicle dynamic behavior detecting means M8 or on the basis of an information transmitted from the outside of the vehicle.

Then, at step S16, a first deviation $\Delta\theta V$ ($\Delta\theta V=\theta V-\theta 1$) between the movement azimuth angle $\theta V$ and the first road azimuth angle $\theta 1$, and a second deviation $\Delta\theta 2$ ($\Delta\theta 2=\theta 2-\theta V$) between the second road azimuth angle $\theta 2$ and the movement azimuth angle $\theta V$ are calculated. Then, the absolute value of the first deviation $\Delta\theta V$ is compared with a predetermined reference value A. As a result, if the absolute value of the first deviation $\Delta\theta V$ is smaller than the reference value A, namely, if the movement azimuth angle $\theta V$ and the first road azimuth angle $\theta 1$ are substantially equal to each other, it is determined that the position of the node $N_1$ in the road shape presumed at step S12 is accurate, and at step S17, the basis control of the vehicle is carried out on the basis of the presumed road shape.

If the absolute value of the first deviation $\Delta\theta V$ is equal to or greater than the reference value A at step S16, namely, if the deviation between the movement azimuth angle $\theta V$ and the first road azimuth angle $\theta 1$ is greater, the processing is advanced to step S18, at which it is determined whether the movement azimuth angle $\theta V$ and the second road azimuth angle $\theta 2$ deviate in the same direction or in opposite directions with respect to the first road azimuth angle $\theta 1$. As a result, as shown in FIGS. 5A and 5B, if the movement azimuth angle $\theta V$ and the second road azimuth angle $\theta 2$ deviate in the same direction with respect to the first road azimuth angle $\theta 1$, the absolute value $|\Delta\theta 2-\Delta\theta V|$ of the deviation resulting from the subtraction of the first deviation $\Delta\theta V$ from the second deviation $\Delta\theta 2$ is compared with a reference value B at step S19. If the absolute value $|\Delta\theta 2-\Delta\theta V|$ of the deviation is equal to or less than the reference value B, it is determined that the position of the node $N_1$ is substantially deviated from the actual road, and at step S20, the position of the node $N_1$ is corrected in a direction to increase the radius of curvature of the curve (in a direction to make the curve more gentle). In other words, the correction of position of the node $N_1$ is carried out, so that the presumed road shape shown by the broken line in each of FIGS. 5A and 5B is matched with the actual road shape shown by the solid line.

The contents of the step S19 will be further described. In the case of the road shapes shown in FIGS. 5A and 5B, both of the first deviation $\Delta\theta V$ and the second deviation $\Delta\theta 2$ are positive and hence, the absolute value $|\Delta\theta 2-\Delta\theta V|$ is equal to $|\Delta\theta 2|-|\Delta\theta V|$. If the node $N_1$ is substantially deviated from the actual road, $|\Delta\theta V|$ is larger and hence, $|\Delta\theta 2|-|\Delta\theta V|$ is smaller, progressing to step S20, at which the correction is carried out in the direction to increase the radius of curvature of the curve. Conversely, if the node $N_1$ is closer to the actual road, $|\Delta\theta V|$ is smaller and hence, $|\Delta\theta 2|-|\Delta\theta V|$ is larger, progressing to step Si 7, and in this case, the correction in the direction to increase the radius of curvature of the curve is not carried out.

Figure 6A:
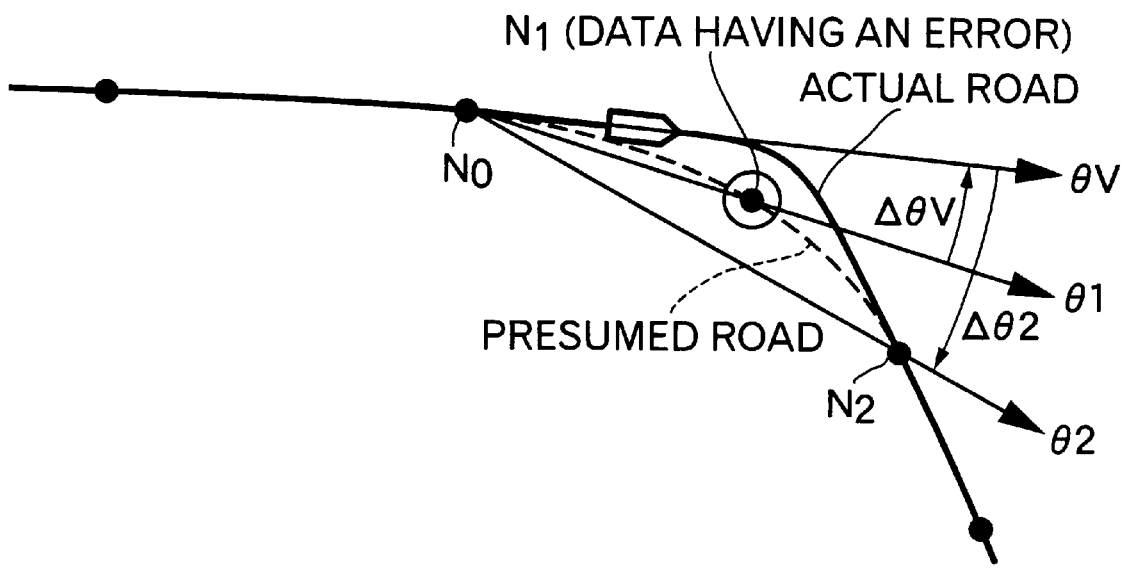
FIGS. 6A and 6B are illustrations for explaining the correction in a direction to decrease the radius of curvature of a curve.
Figure 6B:
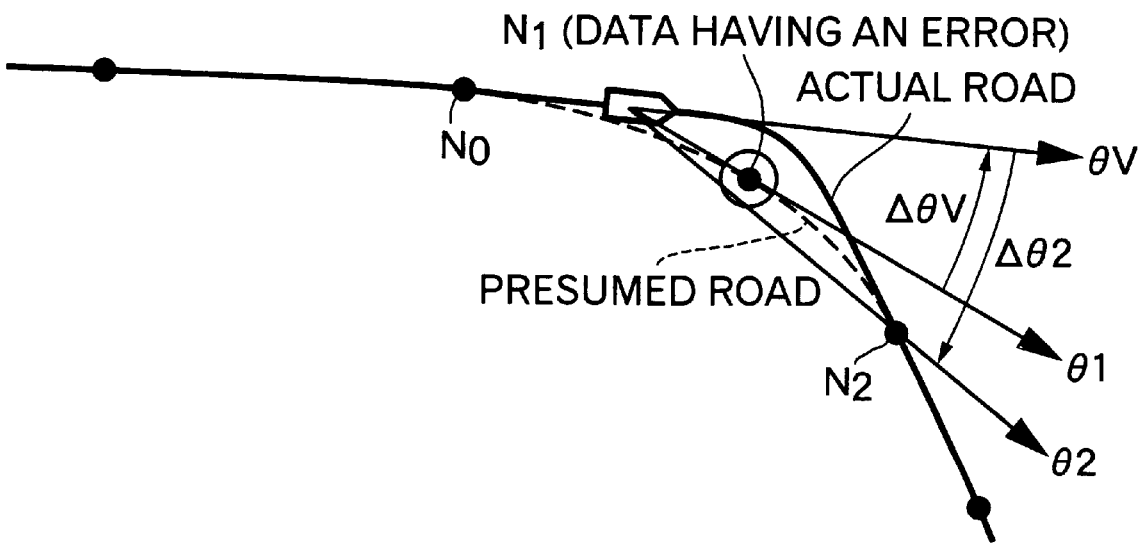

If the movement azimuth angle $\theta V$ and the second road azimuth angle $\theta 2$ deviate in the opposite directions with respect to the first road azimuth angle $\theta 1$ at step S18, the absolute value $|\Delta\theta2|-|\Delta\theta V|$ of the deviation resulting from subtraction of the first deviation $\Delta\theta V$ from the second road deviation $\Delta\theta2$ is compared with a reference value C at step S22. If the absolute value $|\Delta\theta2|-|\Delta\theta V|$ of the deviation is equal to or greater than the reference value C, it is determined that the position of the node $N_1$ is substantially deviated from the actual road, and at step S23, the position of the node $N_1$ is corrected in a direction to decrease the radius of the curvature of the curve (in a direction to steepen the curve). In other words, the correction of the position of the node $N_1$ is carried out, so that the presumed road shape shown by a broken line in each of FIGS. 6A and 6B is matched with the actual road shape shown by the solid line.

The contents of the step S23 will be further described below. In the case of the presumed road shapes shown in FIGS. 6A and 6B, the first deviation $\Delta\theta V$ is a negative value, the second deviation $\Delta\theta2$ is a positive value and hence, the absolute value $|\Delta\theta2|-|\Delta\theta V|$ is equal to $|\Delta\theta2|+|\Delta\theta V|$. If the node $N_1$ is deviated substantially from the actual road, $|\Delta\theta V|$ is larger and hence, $|\Delta\theta2|+|\Delta\theta V|$ is larger, progressing to step S23, at which the correction of the position of the node $N_1$ is carried out in the direction to decrease the radius of curvature of the curve. Conversely, if the node $N_1$ is closer to the actual road, $|\Delta\theta V|$ is smaller and hence, $|\Delta\theta2|+|\Delta\theta V|$ is smaller, progressing to step S17, and in this case, there is no correction in the direction to decrease the radius of curvature of the curve.

When the correction of the position of the node $N_1$ has been carried out in the direction to increase the radius of curvature of the curve at step S20, the basic control is corrected to the suppression at step S21. When the correction of the position of the node $N_1$ has been carried out in the direction to decrease the radius of curvature of the curve at step S23, the basic control is corrected to the promotion at step S24.

The correction of the basic control to the suppression and to the promotion will be described below.

When the radius of curvature of the curve determined by the road shape determining means M4 is larger than the radius of curvature of the curve presumed by the road shape presuming means M1, namely, when the curve of the road is corrected in a gentling direction, the vehicle can easily pass through the curve. Therefore, the vehicle control is prevented from being carried out excessively by correcting the basic control to the suppression, so that the driver does not feel a sense of incompatibility. More specifically, the warning operation for advising the driver of a spontaneous decelerating operation is discontinued; the timing of starting of the warning operation is retarded, and/or the timing of completion of the warning operation is hastened. In addition, the automatic braking operation is discontinued so that the vehicle speed is not excessively reduced when the vehicle passes through the curve; the timing of starting the automatic braking operation is retarded; the timing of completion of the automatic braking operation is hastened, and/or the barking force in the automatic braking operation is decreased.

Conversely, when the radius of curvature of the curve determined by the road shape determining means M4 is smaller than the radius of curvature of the curve presumed by the road shape presuming means M1, namely, when the curve of the road has been corrected in a steepening direction, the vehicle has difficulty passing through the curve. Therefore, the vehicle speed is sufficiently reduced by the driver's spontaneous braking operation or the automatic braking operation by correcting the basic control to the promotion, so that the vehicle can reliably pass through the curve. More specifically, the timing of starting the warning operation for advising the driver of the spontaneous decelerating operation is hastened, and to sufficiently reduce the vehicle speed when the vehicle passes through the curve, the timing of starting the automatic braking operation is hastened; the timing of completion of the automatic braking operation is retarded, and/or the braking force in the automatic braking operation is increased.

As described above, the road shape presumed from the road data is corrected, so that it is matched with the actual road shape, and the warning operation and the vehicle control such as the automatic braking operation are carried out on the basis of the corrected road shape. Therefore, it is possible to prevent the generation of an excess and deficiency in the control quantity of the vehicle control and thus, it is possible for the vehicle to reliably pass through the curve without providing the sense of incompatibility to the driver.

Figure 7:
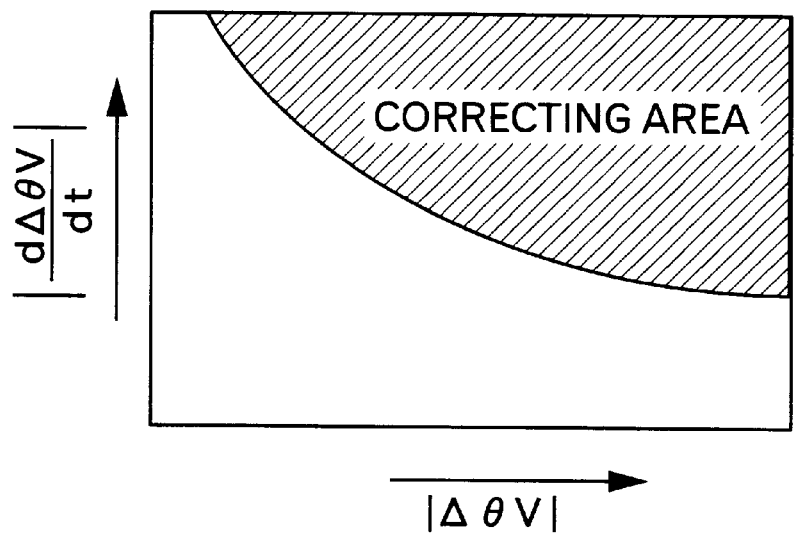
FIG. 7 is a diagram showing a correcting area when the correction is carried out on the basis of $\Delta\theta V$ and $d\Delta\theta V/dt$.
Figure 8:
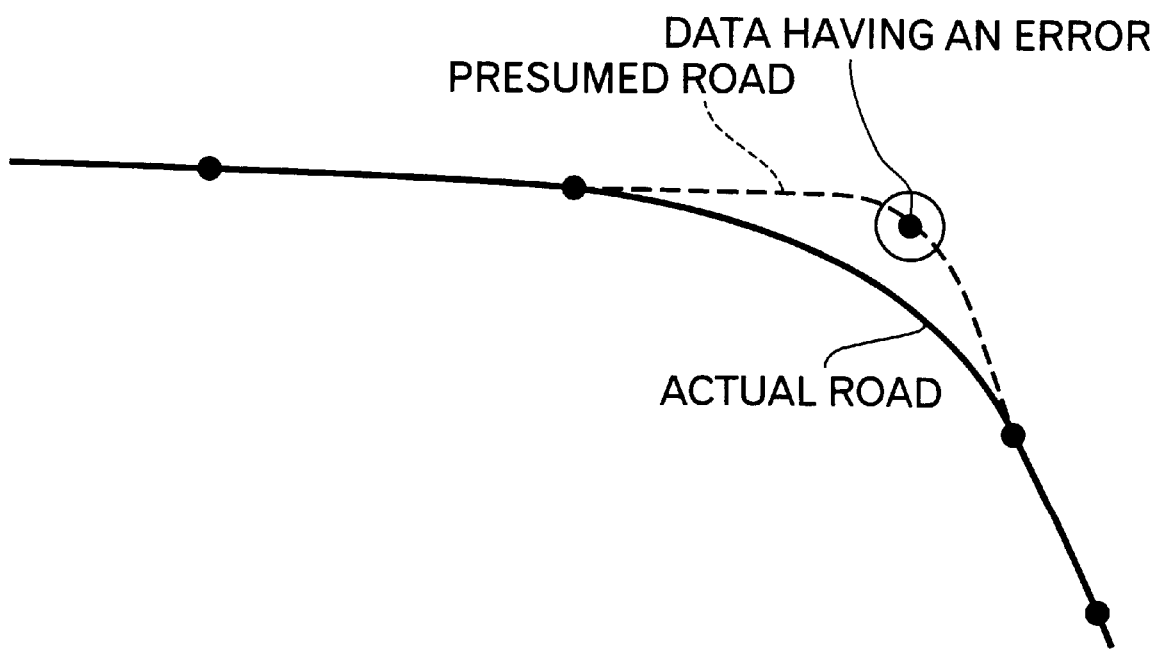
FIG. 8 is an illustration for explaining a problem due to an error of road data.

In place of the determination of whether the correction of the road shape is carried out by comparing the absolute value $|\Delta\theta V|$ of the deviation $\Delta\theta V$ with the reference value A at step S5 in the flow chart shown in FIG. 2 and at step S16 in the flow chart shown in FIG. 4B, it can be determined whether the correction of the road shape is carried out on the basis of a differentiated value or an integrated value of the deviation $\Delta\theta V$ or the combination thereof. FIG. 7 shows an example of a determination of the above-described type which is carried out on the basis of the absolute value $|\Delta\theta V|$ of the deviation $\Delta\theta V$ and the absolute value $|d\Delta\theta V/dt|$ of the differentiated value of the deviation $\Delta\theta V$.

The above-described three reference values A, B and C are values selected properly in designing the control system, and are not specifically limited.

As discussed above, when the road data deviates from the actual road shape, the correct road shape can be determined, by the fact that the road shape determining device comprises the road azimuth angle calculating means for calculating the azimuth angle of the road ahead of the position of the vehicle on the basis of road data; the movement azimuth angle calculating means for calculating the azimuth angle of movement of the vehicle; and the road shape determining means for determining the shape of the road ahead of the position of the vehicle by comparing the road azimuth angle calculated by the road azimuth angle calculating means with the azimuth angle of movement of the vehicle calculated by the movement azimuth angle calculating means.

Further, when the road data deviates from the actual road shape, the correct road shape can be determined, by the fact that the road shape determining device comprises the vehicle dynamic behavior detecting means for detecting the dynamic behavior of the vehicle; the road azimuth angle calculating means for calculating the azimuth angle of the road ahead of the position of the vehicle on the basis of the road data and the dynamic behavior of the vehicle; the movement azimuth angle calculating means for calculating the azimuth angle of movement of the vehicle; and the road shape determining means for determining the shape of the road ahead of the position of the vehicle by comparing the road azimuth angle calculated by the road azimuth angle calculating means with the azimuth angle of movement of the vehicle calculated by the movement azimuth angle calculating means.

The road shape determining means determines the shape of the road ahead of the position of the vehicle in accordance with a deviation between the calculated road azimuth angle and the calculated movement azimuth angle of the vehicle. Therefore, the degree of the deviation between the road data and the actual road shape can be determined to determine the correct road shape.

The movement azimuth angle calculating means calculates the azimuth angle of movement of the vehicle on the basis of the dynamic behavior of the vehicle detected by the vehicle dynamic behavior detecting means. Therefore, the movement azimuth angle can be determined correctly.

Alternatively, the movement azimuth angle calculating means calculates the azimuth angle of movement of the vehicle on the basis of information received from the information transmitting means provided outside the vehicle. Therefore, the movement azimuth angle can be calculated correctly.

The road shape determining means performs the correction in the direction to increase the radius of curvature of the road, when the deviation between the calculated road azimuth angle and the movement azimuth angle is equal to or greater than the reference value. Therefore, the radius of curvature of the road shape can be prevented from being presumed at a value less than the actual value due to an error in the road data.

When the road data deviates from the actual road shape, the correct road shape can be determined by the fact that the road data comprises the aggregate of the plurality of nodes disposed along the road; the road azimuth angle calculating means calculates the first road azimuth angle from the first node ahead of the position of the vehicle and the reference node behind the position of the vehicle, and calculates the second road azimuth angle from the second node ahead of the first node and the reference node; and the road shape determining means determines the shape of the road on the basis of the first deviation between the azimuth angle of movement of the vehicle and the first road azimuth angle and the second deviation between the azimuth angle of movement of the vehicle and the second road azimuth angle.

Alternatively, when the road data deviates from the actual road shape, the correct road shape can be determined by the fact that the road data comprises the aggregate of the plurality of nodes disposed along the road; the road azimuth angle calculating means calculates the first road azimuth angle from the first node ahead of the position of the vehicle and the position of the vehicle, and calculates the second road azimuth angle from the second node ahead of the first node and the position of the vehicle; and the road shape determining means determines the shape of the road on the basis of the first deviation between the azimuth angle of movement of the vehicle and the first road azimuth angle and the second deviation between the azimuth angle of movement of the vehicle and the second road azimuth angle.

When the first deviation is equal to or greater than the reference value and the azimuth angle of movement of the vehicle and the second road azimuth angle deviate in the same direction with respect to the first road azimuth angle, the road shape determining means performs the correction in the direction to increase the radius of curvature of the road. Therefore, the direction of deviation of the road data can be reliably perceived to correctly determine the road shape.

When the first deviation is equal to or greater than the reference value and the azimuth angle of movement of the vehicle and the second road azimuth angle deviate in the opposite directions with respect to the first road azimuth angle, the road shape determining means performs the correction in the direction to decrease the radius of curvature of the road. Therefore, the direction of deviation of the road data can be reliably perceived to correctly determine the road shape.

In place of the first deviation, the differentiated value or integrated value of the first deviation can be compared with the reference value. Therefore, the determination of the road shape can be carried out more correctly.

The vehicle control system for controlling a vehicle on the basis of the road shape determined by the road shape determining device comprises a vehicle curve speed calculating means for calculating the appropriate vehicle curve speed for passing through the road ahead of the position of the vehicle on the basis of the determined road shape, and the vehicle control means for carrying out the vehicle control on the basis of the vehicle speed of the vehicle and the calculated appropriate vehicle curve speed. Therefore, it is possible to precisely carry out the vehicle control for allowing the vehicle to pass through the road ahead of the vehicle on the basis of the determined correct road shape.

The vehicle control includes a warning operation for advising the driver of a spontaneous decelerating operation. Therefore, the vehicle can be decelerated to pass through the road ahead of the vehicle.

The vehicle control also includes an automatic braking operation for decelerating the vehicle. Therefore, the vehicle can be decelerated to pass through the road ahead of the vehicle.

When the road shape determining means performs the correction in the direction to increase the radius of curvature of the road, the carrying-out of the warning operation is stopped; the timing of starting the warning operation is retarded; or the timing of completion of the warning operation is hastened, and when the road shape determining means performs the correction in the direction to decrease the radius of curvature of the road, the timing of starting the warning operation is hastened, or the timing of completion of the warning operation is retarded. Therefore, excessive vehicle control is avoided when the curve of the actual road is gentle. Thus, it is possible to prevent the driver from feeling the sense of incompatibility.

When the road shape determining means performs the correction in a direction to increase the radius of curvature of the road, the automatic braking operation is stopped; the timing of starting the automatic braking operation is retarded; the timing of completion of the automatic braking operation is hastened; or deceleration in the automatic braking operation is decreased, and when the road shape determining means performs the correction in the direction to decrease the radius of curvature of the road, the timing of starting the automatic braking operation is hastened; the timing of completion of the automatic braking operation is retarded, or the deceleration in the automatic braking operation is increased. Therefore, when the curve of the actual road is steep, satisfactory vehicle control can be carried out to decelerate the vehicle, so that the vehicle can reliably pass through the road ahead of the vehicle.

Although the embodiments of the present invention have been described in detail, it will be understood that the present invention is not limited to the above-described embodiments, and various modifications in design may be made without departing from the subject matter of the present invention.

I claim:

1. A road shape determining device for determining the shape of a road ahead of the position of a vehicle on the basis of road data, comprising a road azimuth angle calculating means for calculating an azimuth angle ($\theta_1$, $\theta_2$) of the road ahead of the vehicle on the basis of the road data;

a movement azimuth angle calculating means for calculating an azimuth angle ($\theta V$) of movement of the vehicle; and a road shape determining means coupled to said road azimuth angle calculating means and said movement angle calculating means, for determining the shape of the road ahead of the position of the vehicle by comparing the road azimuth angle ($\theta 1$, $\theta 2$) calculated by said road azimuth angle calculating means with the azimuth angle ($\theta V$) of movement of the vehicle calculated by said movement azimuth angle calculating means.

2. A road shape determining device for determining the shape of a road ahead of the position of a vehicle on the basis of road data, comprising a vehicle dynamic behavior detecting means for detecting a dynamic behavior of the vehicle;

a road azimuth angle calculating means for calculating an azimuth angle ($\theta 1$, $\theta 2$) of the road ahead of the vehicle on the basis of the road data and the dynamic behavior of the vehicle;

a movement azimuth angle calculating means coupled to said vehicle dynamic behavior detecting means, for calculating an azimuth angle ($\theta V$) of movement of the vehicle; and a road shape determining means coupled to said road azimuth angle calculating means and said movement azimuth angle calculating means, for determining the shape of the road ahead of the vehicle by comparing the road azimuth angle ($\theta 1$, $\theta 2$) calculated by said road azimuth angle calculating means with the azimuth angle ($\theta V$) of movement of the vehicle calculated by said movement azimuth angle calculating means.

3. A road shape determining device according to claim 1, wherein said road shape determining means determines the shape of the road ahead of the vehicle in accordance with a function of a deviation between the calculated road azimuth angle ($\theta 1$, $\theta 2$) and the calculated movement azimuth angle ($\theta V$) of the vehicle.

4. A road shape determining device according to claim 2, wherein said road shape determining means determines the shape of the road ahead of the vehicle in accordance with a function of a deviation between the calculated road azimuth angle ($\theta 1$, $\theta 2$) and the calculated movement azimuth angle ($\theta V$) of the vehicle.

5. A road shape determining device according to claim 2, wherein said movement azimuth angle calculating means calculates the azimuth angle ($\theta V$) of movement of the vehicle on the basis of the dynamic behavior of the vehicle detected by said vehicle dynamic behavior detecting means.

6. A road shape determining device according to claim 1 or 2, including information transmitting means positioned apart from the vehicle, wherein said movement azimuth angle calculating means calculates the azimuth angle ($\theta V$) of movement of the vehicle on the basis of information received from said information transmitting means.

7. A road shape determining device according to claim 3, wherein said road shape determining means corrects the determined road shape in a direction to increase a radius of curvature of the road, when the function of the deviation between the calculated road azimuth angle ($\theta 1$) and the movement azimuth angle ($\theta V$) is equal to or greater than a reference value.

8. A road shape determining device according to claim 4, wherein said road shape determining means corrects the determined road shape in a direction to increase a radius of curvature of the road, when the function of the deviation between the calculated road azimuth angle ($\theta 1$) and the movement azimuth angle ($\theta V$) is equal to or greater than a reference value.

9. A road shape determining device according to claim 3, wherein said road data comprises an aggregate of a plurality of nodes disposed along the road; said road azimuth angle calculating means calculates a first road azimuth angle ($\theta 1$) from a first node ahead of the vehicle and a reference node behind the vehicle, and calculates a second road azimuth angle ($\theta 2$) from a second node ahead of said first node and said reference node; and said road shape determining means determines the shape of the road on the basis of a first function of the deviation between the azimuth angle ($\theta V$) of movement of the vehicle and said first road azimuth angle ($\theta 1$) and a second function of the deviation between the azimuth angle ($\theta V$) of movement of the vehicle and said second road azimuth angle ($\theta 2$).

10. A road shape determining device according to claim 4, wherein said road data comprises an aggregate of a plurality of nodes disposed along the road; said road azimuth angle calculating means calculates a first road azimuth angle ($\theta 1$) from a first node ahead of the vehicle and a reference node behind the vehicle, and calculates a second road azimuth angle ($\theta 2$) from a second node ahead of said first node and said reference node; and said road shape determining means determines the shape of the road on the basis of a first function of the deviation between the azimuth angle ($\theta V$) of movement of the vehicle and said first road azimuth angle ($\theta 1$) and a second function of the deviation between the azimuth angle ($\theta V$) of movement of the vehicle and said second road azimuth angle ($\theta 2$).

11. A road shape determining device according to claim 3, wherein said road data comprises an aggregate of a plurality of nodes disposed along the road; said road azimuth angle calculating means calculates a first road azimuth angle ($\theta 1$) from a first node ahead of the vehicle and calculates a second road azimuth angle ($\theta 2$) from a second node ahead of said first node and the position of the vehicle; and said road shape determining means determines the shape of the road on the basis of a first deviation ($\Delta \theta V$) between the azimuth angle ($\theta V$) of movement of the vehicle and said first road azimuth angle ($\theta 1$) and a second deviation ($\Delta \theta 2$) between the azimuth angle ($\theta V$) of movement of the vehicle and said second road azimuth angle ($\theta 2$).

12. A road shape determining device according to claim 4, wherein said road data comprises an aggregate of a plurality of nodes disposed along the road; said road azimuth angle calculating means calculates a first road azimuth angle ($\theta 1$) from a first node ahead of the vehicle and calculates a second road azimuth angle ($\theta 2$) from a second node ahead of said first node and the position of the vehicle; and said road shape determining means determines the shape of the road on the basis of a first deviation ($\Delta \theta V$) between the azimuth angle ($\theta V$) of movement of the vehicle and said first road azimuth angle ($\theta 1$) and a second deviation ($\Delta \theta 2$) between the azimuth angle ($\theta V$) of movement of the vehicle and said second road azimuth angle ($\theta 2$).

13. A road shape determining device according to claims 9, 10, 11 or 12, wherein when said first function of the deviation is equal to or greater than a reference value and the azimuth angle of movement of the vehicle and said second road azimuth angle ($\theta 2$) deviate in the same direction as each other with respect to said first road azimuth angle ($\theta 1$), said road shape determining means corrects in a direction to increase a radius of curvature of the road.

14. A road shape determining device according to claims 9, 10, 11 or 12, wherein when said first function of the deviation is equal to or greater than a reference value and the azimuth angle of movement of the vehicle and said second road azimuth angle ($\theta 2$) deviate in opposite directions to each other with respect to said first road azimuth angle ($\theta 1$), said road shape determining means (M4) corrects in a direction to decrease a radius of curvature of the road.

15. A road shape determining device according to any one of claims 3 or 4, wherein the first function of the deviation is a difference between the azimuth angle ($\theta V$) of movement of the vehicle and the first road azimuth angle ($\theta 1$) and the second function of the deviation is a difference between the azimuth angle ($\theta V$) of movement of the vehicle and the road azimuth angle ($\theta 2$).

16. A road shape determining device according to any one of claims 3 or 4, wherein the first function of the deviation is a differential of a difference between the azimuth angle ($\theta V$) of movement of the vehicle and the first road azimuth angle ($\theta 1$) and the second function of the deviation is a differential of a difference between the azimuth angle ($\theta V$) of movement of the vehicle and the road azimuth angle ($\theta 2$).

17. A road shape determining device according to any one of claims 3 or 4, wherein the first function of the deviation is an integral of a difference between the azimuth angle ($\theta V$) of movement of the vehicle and the first road azimuth angle ($\theta 1$) and the second function of the deviation is an integral of a difference between the azimuth angle ($\theta V$) of movement of the vehicle and the road azimuth angle ($\theta 2$).

18. A vehicle control system for controlling a vehicle on the basis of the shape of a road determined by a road shape determining device according to any one of claims 1 or 2, comprising vehicle speed calculating means for calculating a vehicle speed for passing through a road ahead of the position of the vehicle on the basis of the determined road shape; and a vehicle control means for controlling the vehicle on the basis of an actual vehicle speed of the vehicle and the calculated vehicle speed.

19. A vehicle control system according to claim 18, wherein said vehicle control means generates a warning for advising a driver to make a spontaneous decelerating operation.

20. A vehicle control system according to claim 18, wherein said vehicle control means generates an automatic braking operation for decelerating the vehicle.

21. A vehicle control system according to claim 19, wherein when said road shape determining means corrects in a direction to increase the radius of curvature of the road, the warning of said control means is stopped.

22. A vehicle control system according to claim 19, wherein when said road shape determining means corrects in a direction to increase the radius of curvature of the road, the timing of starting the warning by said control means is retarded.

23. A vehicle control system according to claim 19, wherein when said road shape determining means corrects in a direction to increase the radius of curvature of the road, the timing of finishing the warning by said control means is advanced.

24. A vehicle control system according to claim 19, wherein when said road shape determining means corrects in a direction to decrease the radius of curvature of the road, the timing of starting the warning by said control means is advanced.

25. A vehicle control system according to claim 19, wherein when said road shape determining means corrects in a direction to decrease the radius of curvature of the road, the timing of finishing the warning by said control means is retarded.

26. A vehicle control system according to claim 20, wherein when said road shape determining means corrects in a direction to increase the radius of curvature of the road, the automatic braking operation by said control means is stopped.

27. A vehicle control system according to claim 20, wherein when said road shape determining means corrects in a direction to increase the radius of curvature of the road, the timing of starting the automatic braking operation by said control means is retarded.

28. A vehicle control system according to claim 20, wherein when said road shape determining means corrects a direction to increase the radius of curvature of the road, the timing of completion of automatic braking operation by said control means is advanced.

29. A vehicle control system according to claim 20, wherein when said road shape determining means corrects in a direction to increase the radius of curvature of the road, the deceleration in the automatic braking operation by said control means is decreased.

30. A vehicle control system according to claim 20, wherein when said road shape determining means corrects in a direction to decrease the radius of curvature of the road, the timing of starting the automatic braking operation is advanced.

31. A vehicle control system according to claim 20, wherein when said road shape determining means corrects in a direction to decrease the radius of curvature of the road, the timing of completion of the automatic braking operation is retarded.

32. A vehicle control system according to claim 20, wherein when said road shape determining means corrects in a direction to decrease the radius of curvature of the road, a deceleration in the automatic braking operation is increased.

* * * * *